(12) United States Patent
Anderson et al.

(10) Patent No.: US 8,717,318 B2
(45) Date of Patent: May 6, 2014

(54) CONTINUED VIRTUAL LINKS BETWEEN GESTURES AND USER INTERFACE ELEMENTS

(75) Inventors: Glen J. Anderson, Beaverton, OR (US); Ryan Palmer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 13/074,639

(22) Filed: Mar. 29, 2011

(65) Prior Publication Data

US 2012/0249429 A1 Oct. 4, 2012

(51) Int. Cl.
*G09G 5/00* (2006.01)
(52) U.S. Cl.
USPC .......................... 345/173; 715/863; 715/864
(58) Field of Classification Search
USPC ............ 345/156, 173, 175; 178/18.03–18.07, 178/18.09; 715/863, 864
See application file for complete search history.

(56) References Cited

U.S. PATENT DOCUMENTS

| | | | |
|---|---|---|---|
| 8,077,157 B2 * | 12/2011 | Sengupta et al. | 345/173 |
| 8,194,043 B2 * | 6/2012 | Cheon et al. | 345/173 |
| 8,350,814 B2 * | 1/2013 | Kim et al. | 345/168 |
| 2007/0126696 A1 * | 6/2007 | Boillot | 345/156 |
| 2008/0309626 A1 * | 12/2008 | Westerman et al. | 345/173 |
| 2009/0135135 A1 * | 5/2009 | Tsurumi | 345/156 |
| 2009/0228841 A1 * | 9/2009 | Hildreth | 715/863 |
| 2011/0107216 A1 * | 5/2011 | Bi | 715/716 |
| 2011/0175920 A1 * | 7/2011 | Ieperen | 345/473 |
| 2011/0179368 A1 * | 7/2011 | King et al. | 715/769 |
| 2011/0193778 A1 * | 8/2011 | Lee et al. | 345/158 |
| 2011/0197147 A1 * | 8/2011 | Fai | 715/753 |
| 2012/0169646 A1 * | 7/2012 | Berkes et al. | 345/174 |

OTHER PUBLICATIONS

Kane et al., "Bonfire: A Nomadic System for Hybrid Laptop-Tabletop Interaction", Proceedings of the 22nd Annual ACM Symposium on User Interface Software and Technology, Oct. 4-7, 2009, pp. 129-138.
Bonfire from Intel Labs Seattle and University of Washington: Hybrid Laptop-Tabletop Interaction, Available at:<http://www.youtube.com/watch?v=mgtTo7JD_dc>.
"Kitty Cat Coin Toss", available at: <http://iphone.wareseeker.com/kitty-cat-coin-toss.app/42e312be25>.
Benko et al., "DepthTouch: Using Depth-Sensing Camera to Enable Freehand Interactions On and Above the Interactive Surface", IEEE Work-shop on Tabletops and Interactive Surfaces, Oct. 1-3, 2008, 8 pages.

* cited by examiner

*Primary Examiner* — Tom Sheng
(74) *Attorney, Agent, or Firm* — Buckley, Maschoff & Talwalkar LLC

(57) ABSTRACT

A device includes a processor to receive input data from an image detector, where the input data includes data obtained from tracking air movements of a user's body part interacting with a virtual object of the electronic display, the processor to map the input data to a control input to move the virtual object beyond the display. The device could, for example, include a mobile device such as a smartphone or a laptop. The virtual object could for example move to another display or to a bezel of the device. A touch screen sensor may allow the virtual object to be pinched from the display, before being lifted beyond the display. The processor may map the input data to control input to create a virtual binding of the virtual object in order to create a visual rendering of a connection between the virtual object and the user's body part.

31 Claims, 10 Drawing Sheets

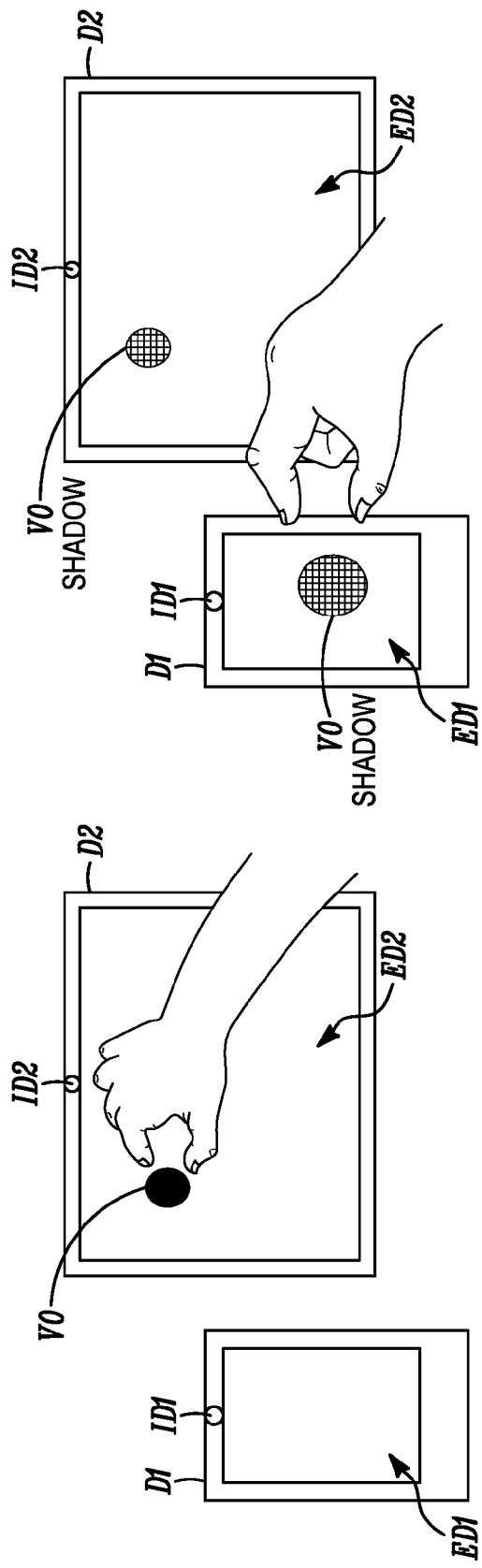

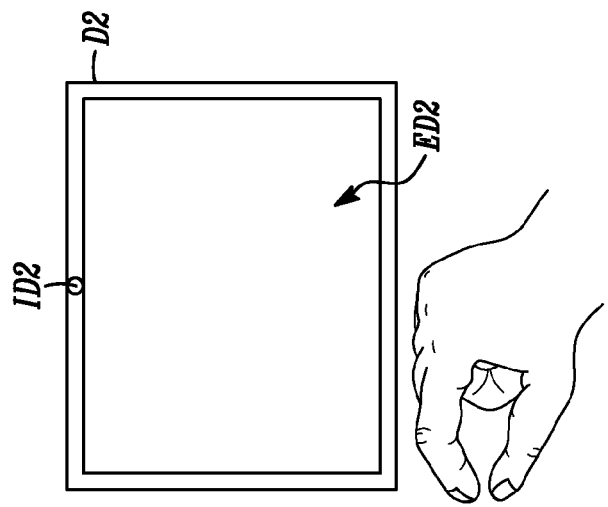
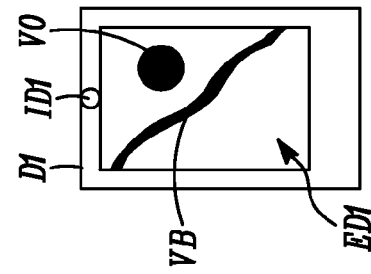
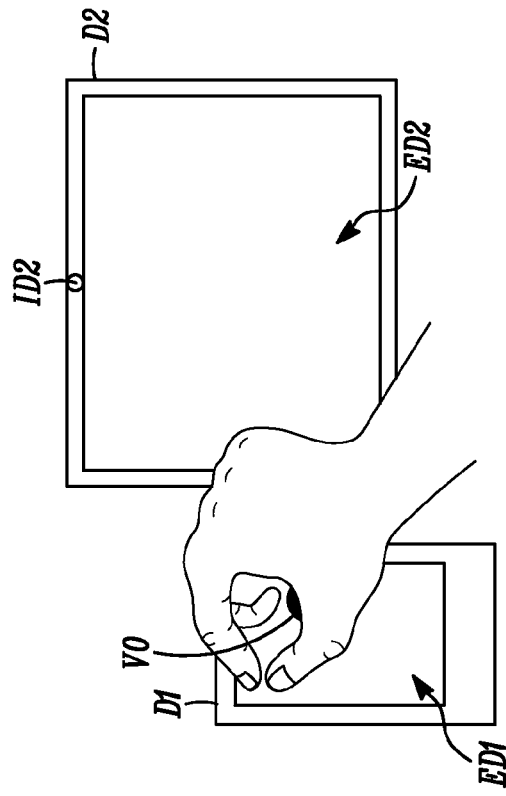
FIG. 2B
FIG. 2A

CONTINUED VIRTUAL LINKS BETWEEN GESTURES AND USER INTERFACE ELEMENTS

BACKGROUND

Typical computing input air-gestures (air-gestures as opposed to touch screen gestures) can involve users moving their body and having a corresponding action happen on a display. Current air gesture technology uses either sensors (such as in the Wii remote controller by the Nintendo Company) or 3D camera technology (such as in the Microsoft Kinect by the Microsoft Corporation) to approximate body motion as a modal input source. Television displays are typical feedback mechanisms for viewing the effects of air-gesture modal input on a graphical environment. Integrated cameras are known that gather video input for gesture detection, and rudimentary interpretation of gesture input may accomplished with software that can run on a PC. QualiEYE by the EVAS Corporation is an example of this type of software product. The addition of depth sensing camera technology has also been known to provide the ability to recognize where a person's body is in relation to a display or compute device. In addition, mobile displays that incorporate touch-screen technology, such as laptops, tablets and smartphones the screens of which respond to touch input are also well known. Touch and sweep gestures on a display screen to move objects from one screen (e.g. a handheld console screen) to another screen (e.g. a TV screen) in the context of electronic games have also been made possible, and may be implemented for example when using the PlayStation Portable game console marketed by the Sony Corporation. In addition, the Kitty Cat Coin Toss marketed through iTunes by the Apple Corporation is an application that can detect a flip motion of an iPhone and flips a virtual coin on the iPhone's screen. Above-screen interactions with objects on a screen using gesture have also been researched.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 1a-1h illustrate a process to move a virtual object across screens according to a first embodiment;

FIGS. 2a-2d illustrate a process to move a virtual object across screens according to a second embodiment;

DETAILED DESCRIPTION

Figure 1B:
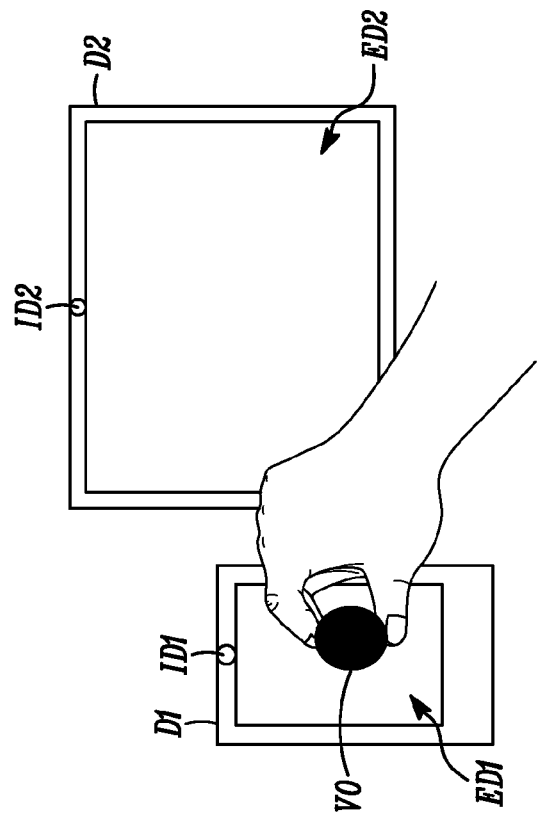

As camera technology with the ability to detect human motion in three dimensions continues to shrink in size and price, eventually laptops and smartphones can become a platform for camera technology involving the use of cameras to detect user gestures as modal inputs to devices using mobile platforms. Since, as noted previously, mobile displays that respond to touch are becoming ubiquitous on mobile devices, an embodiment proposes pairing air-gesture input closely with touch-gesture for electronic devices in order to allow a more versatile manipulation of objects. According to one embodiment, the air movements of a user's body part are tracked using an image detector, and input data from such tracking is mapped to control input to move a virtual object beyond an electronic display. By "display," what is meant is a visual display, whether on a screen of a device, or whether projected from a device to form a visual image exterior to the device, such as, for example, a projected display on wall.

The instant description provides several novel interaction approaches and gestures that may for example be accomplished with touch screens and 3D cameras. It also proposes cross-device gestures to move objects in novel ways across displays, for example across displays on separate devices.

According to embodiments, a device includes a processor to receive input data from an image detector, where the input data includes data obtained from tracking air air movements of a user's body part interacting with a virtual object of the electronic display, the processor to map the input data to a control input to move the virtual object beyond the display. The device could, for example, include a mobile device such as a smartphone or a laptop. The processor according to embodiments is to map the input data to a control input to move the virtual object beyond the electronic display. Thus, the processor could map the input data to the control input to, for example, either move the virtual object from the display to another display, or move the virtual object to a virtual space (e.g. a bezel) of the device. According to one embodiment, input data is fed to the processor from both an image detector and a touch screen sensor coupled to a screen of the display in order to allow a mapping of the input data to control data to move the virtual object beyond the display. For example, the touch screen sensor may allow the virtual object to be pinched from the display, before being removed or lifted beyond the display. A pinch gesture may thus allow one to control an object, while a removal gesture may allow one to virtually remove that object from a display. Optionally, the processor may map the input data to control input to create a virtual binding of the virtual object in order to create a visual rendering of a connection between the virtual object and the user's body part. The virtual binding may comprise a visual rendering, such as in 3D, of a connection between a user's body part and the VO that is being controlled by the user's body part. A virtual binding may for example be depicted as a 3D virtual tether between the fingers and the VO being manipulated. The virtual binding could thus for example be a dynamic screen image that graphically depicts how a VO that is virtually controlled by a user's body part behaves in response to the user moving that body part. The appearance of the binding may be determined by an angle and position of the body part holding the VO. #According to another embodiment, the processor is to map the input data to control input to place the virtual object onto a second display of a second electronic device. The air movements may include a releasing motion of the user's body part with respect to a target location of the virtual object on this second display. The processor may further map the input data to control input to determine an inertial behavior of the virtual object once on the second display. In the instant description, reference to a "user's body part" is meant to refer to any body part, such as a hand, finger, palm knuckles, feet, legs, eyes, head, etc. In addition, reference to a "user's hand" is meant to encompass all of a user's hand, and/or including any part of the hand, such as fingers, palm, knuckles, etc.

Embodiments will be described with respect to the examples of FIGS. 1a-1h, FIGS. 2a-2d and FIGS. 3a-3c, each of those in conjunction with FIG. 4.

Referring to of FIGS. 1a-1h, FIGS. 2a-2d and FIGS. 3a-3c common elements as between those figures will now be described. In each of those figures, the virtual object VO is depicted as a ball for ease of depiction, although it is understood that the VO may have any suitable shape. The VO may for example include an icon, a picture or an animated graphical illustration. The VO may for example include a graphical representation of an object sensed by standard camera input, or characteristics, such as color, that the user may select. The VO may further include a game piece with attributes that cause it to act in a certain way, such as a bomb versus an arrow in a game setting. In addition, the VO may include a single VO, or a plurality of VO's. Also shown in the noted figures are two devices D1 and D2 (although D2 is not necessarily needed in the embodiment of FIGS. 3a-3c). In the shown embodiments, D1 is depicted as a smartphone device including a display ED1, and D2 is depicted as a personal computer including a display ED2. As seen in FIGS. 1a-1h, FIGS. 2a-2d and FIGS. 3a-3c, each of D1 and D2 are equipped with an image detector ID1 and ID2, respectively. The various components shown in FIGS. 1a-1h, FIGS. 2a-2d and FIGS. 3a-3c are explained in further detail with respect to FIG. 4 below.

Figure 3A:
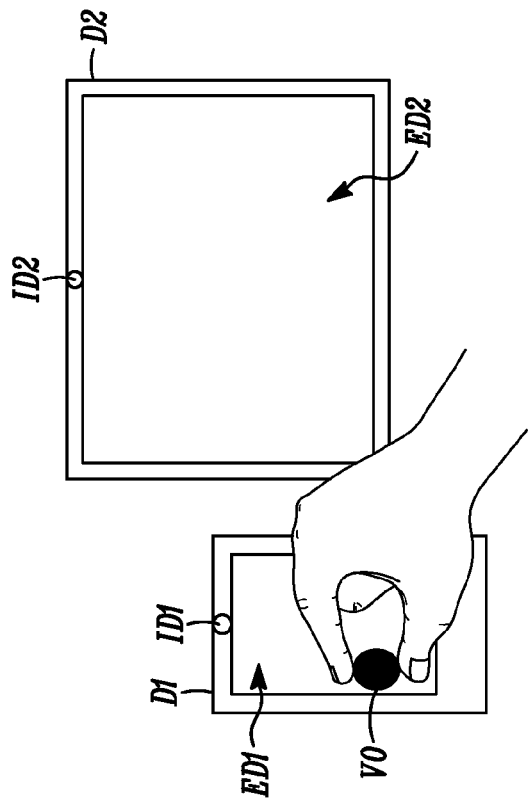
FIGS. 3a-3c illustrate a process to move a virtual object to a bezel area of a display screen.
Figure 3B:
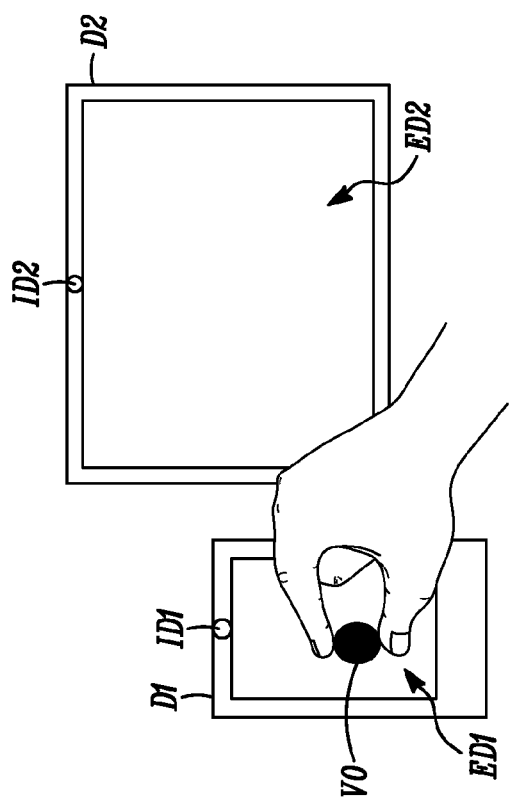
Figure 3C:
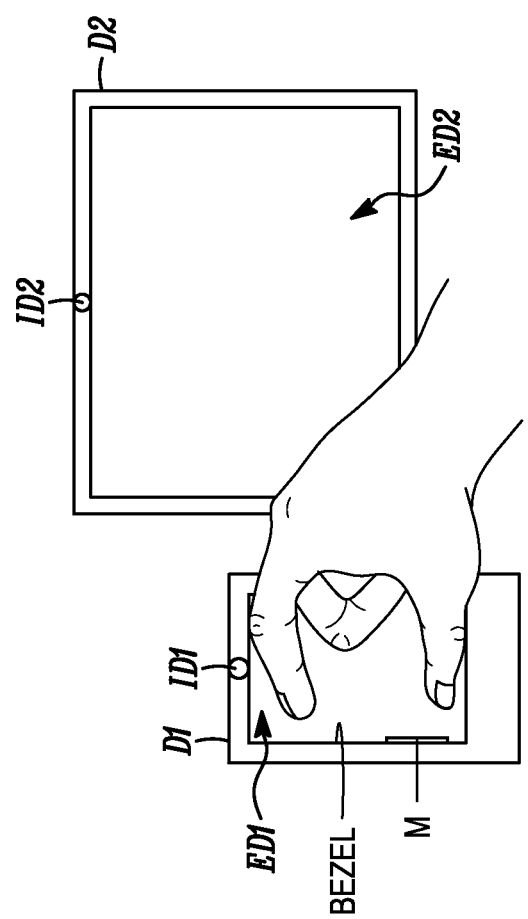
Figure 4:
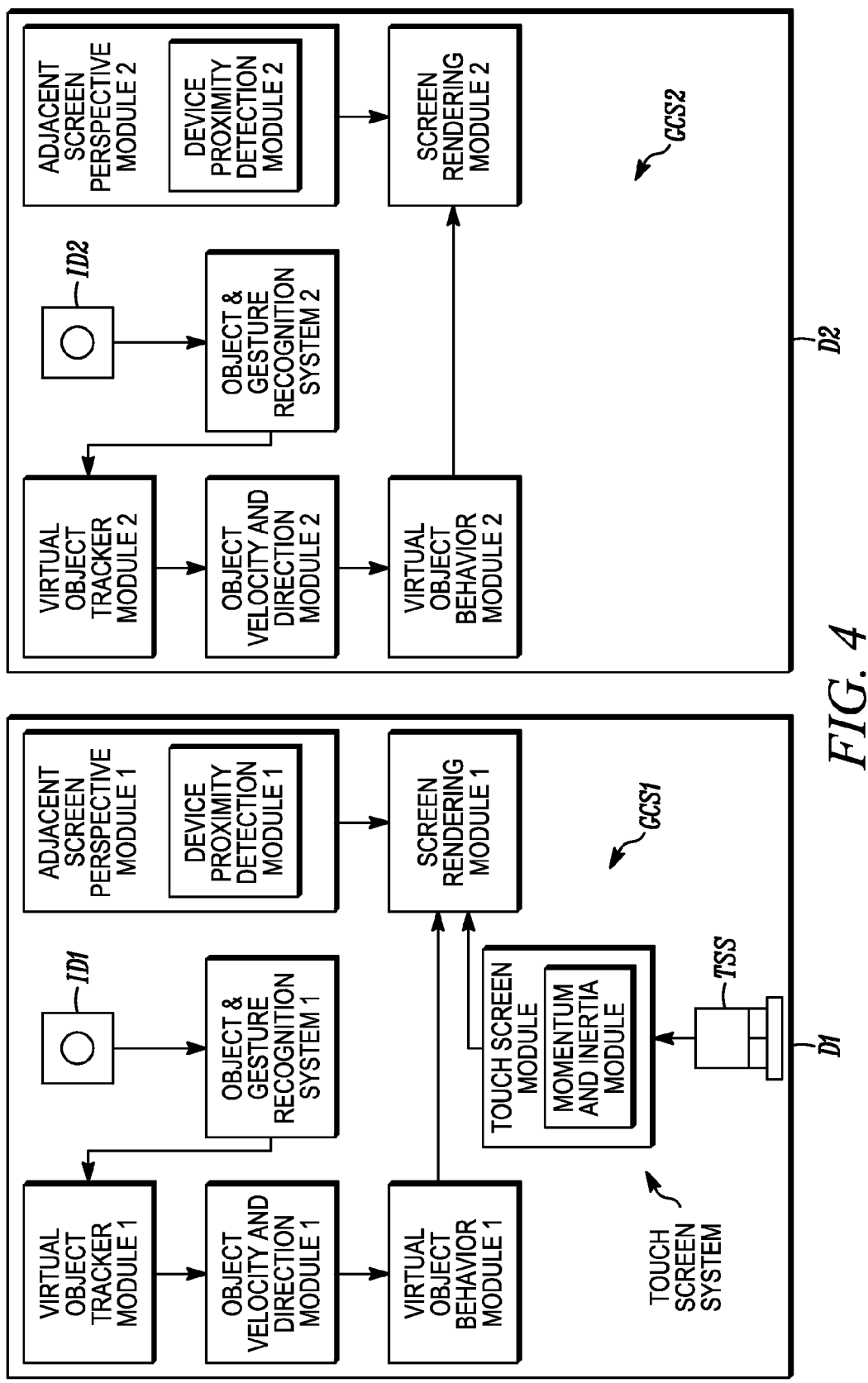
FIG. 4 shows a diagram of an embodiment of the first display and the second display shown in FIGS. 1a-1h or 2a-2d, including functional modules.

Referring now to FIG. 4 in conjunction with FIGS. 1a-1h, FIGS. 2a-2d and FIGS. 3a-3c, each of D1 and D2 may incorporate a gesture capturing system (GCS1 and GCS2) as shown. Each GCS may include one or more processors in order to effect the functions to be described below. In each of D1 and D2 as shown, there exists an image detector ID1/ID2, and a bundle of input data processing modules, which include an Object and Gesture Recognition Module 1/2, a Virtual Object Tracker Module 1/2, an Object Velocity and Direction Module 1/2, and a Virtual Object Behavior Module 1/2. Each bundle of modules in the shown embodiment also includes an Adjacent Screen Perspective Module 1/2 and a Screen Rendering Module 1/2. The Adjacent Screen Perspective Module 1/2 may include a Device Proximity Detection Module 1/2. The contribution of each of the modules within the bundle of modules in each GCS 1/2 will be explained below. The Object and Gesture Recognition Module 1/2, the Virtual Object Tracker Module 1/2, the Object Velocity and Direction Module 1/2, the Virtual Object Behavior Module 1/2, the Adjacent Screen Perspective Module 1/2 and a Screen Rendering Module 1/2, the Adjacent Screen Perspective Module 1/2 and the Device Proximity Detection Module 1/2 may be representative of hardware, software, firmware or a combination thereof.

Referring first to the image detector ID 1/2, the ID may include, for example, one or more 3D depth sensing cameras, or an optical detection array infused behind a visible display and outer bezel. For example, the bezel of one of the devices may contain IR emitters and an IR receiver to allow position tracking of user gestures. The ID may for example be adapted to capture air movements of a user's body part in the form of images, and to feed such input data to the Object and Gesture Recognition Module.

The Object and Gesture Recognition Module may be adapted to recognize and track hand and harm gestures of a user, and its general implementation is currently part of the state of the art. Such a module may be used to recognize hands, fingers, finger gestures, hand movements and a location of hands relative to displays. For example, the Object and Gesture Recognition Module could for example determine that a user made a body part gesture to drop or throw the VO onto ED1 or ED2, or that the user made a body part gesture to move the VO to a bezel of D1 or D2.

The Virtual Object Tracker Module on the other hand may be adapted to track where a VO should be located in three dimensional space in a vicinity of an electronic display, such as ED1 or ED2 for example, and which body part of the user is holding the VO, based on input from the Object and Gesture Recognition Module. The Virtual Object Tracker Module 1 and Virtual Object Tracker Module 2 may for example both track a VO as it moves from ED1 toward ED2, and they may track which body part of the user is holding that VO. Tracking the body part that is holding the VO allows a continuous awareness by one or more GCS' of the body part's air movements, and thus an eventual awareness by one or more GCS' as to whether the VO has been released onto either ED1 or ED2 as will be further explained below. In addition, where a user's body part may interact with a display to create a virtual binding, the Virtual Object Tracker Module may be adapted to track such bindings as the body parts move in the air, which tracking may be correlated with input from the Adjacent Screen Perspective Module to be described in the paragraph below. In addition, when the Virtual Object Tracker Module determines that the user's body part holding a VO is positioned beyond an ED, such as ED1, and either that no additional ED's are in the VO's trajectory, for example, the Virtual Object Tracker Module may send an input directly to the Screen Rendering Module to show a map view that includes a representation of the surrounding area. The map view is a virtual representation of objects saved within a device that may not normally be shown on the display, such as objects saved within the bezel area, and can be virtually pulled out of the bezel area (for example by virtually pulling out a marker next to the bezel area) to be observed. The map thus provides visual feedback when manipulating a VO along a plane and assists the user in selecting a destination target during manipulation beyond the physical ED or between multiple ED's when traveling in virtual space.

The Adjacent Screen Perspective Module, which may include the Device Proximity Detection Module, may be adapted to determine an angle of the screen of one display relative to a screen of another display, such as a relative angle of the screen of ED1 to the screen of ED2, for example if the Adjacent Screen Perspective Module is Adjacent Screen Perspective Module 1, and vice versa if the Adjacent Screen Perspective Module is Adjacent Screen Perspective Module 2. For example in the embodiment of FIGS. 1a-1h and 2a-2d, where D1 is a smartphone and D2 is a personal computer, Adjacent Screen Perspective Module 2 in D2 may be adapted to detect the presence of D1, and to use an analysis of images of the VO originating from ED1 to determine an angle of D1's screen relative to D2's screen. Such detection of screens and angles of displayed areas through software that detects the shape of light emitted from projected display is part of the state of the art. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photodetection sensing capability. For technologies that allow projected displays with touch input, software currently exists that analyzes incoming video to determine the position of a projected display and to correct for the distortion caused by displaying at an angle. In the case of embodiments, use of an accelerometer could for example allow determining the angle at which a device, such as D1, is being held while infrared could allow determination of orientation of the device D1 in relation to the sensors on the adjacent device D2. According to embodiments, using such software, the Adjacent Screen Perspective Module, D2 may determine coordinates of D1's screen relative to its own screen coordinates. Thus, the Adjacent Screen Perspective Module may determine which devices are in proximity to each other, and further potential targets for moving one or more VO's across screens. The Adjacent Screen Perspective Module may further propose target landing or release zones for the VO on the target screen, for example in the form of a shadow on ED2 if the VO is being moved from ED1 to ED2.

The Object and Velocity and Direction Module may be adapted to estimate the dynamics of a VO being moved, such as its trajectory, velocity (whether linear or angular), momentum (whether linear or angular), etc. by receiving input from the Virtual Object Tracker Module. The Object and Velocity and Direction Module may further be adapted to estimate dynamics of a virtual binding if one is used, by for example estimating the degree of stretching of the virtual binding, and its dynamic behavior once released by a user's body part. In the latter case, the Object and Velocity and Direction Module may build on existing software and hardware that tracks user interaction with 3D images that appear to be coming out of a screen. For example, gesture detection in conjunction with a BiDi (Bi-Directional) screen has already been proposed in prototype technology developed at the Massachusetts Institute of Technology. See http://web.media.mit.edu/~mhirsch.bidi. The Object and Velocity and Direction Module may also build on existing modules that use image motion, size and angle changes to estimate the velocity of objects, such as the velocity of hands and fingers, which modules are currently used in games, such as, for example, in games utilizing the Softkinetic Iisu™ SDK by the Softkinetic Corporation. See http://www.softkinetic.net/Solutions/iisuSDK.aspx. According to one embodiment, for example, such software may be used to compensate for and/or determine the shape of a VO or of a virtual binding to be defined below, correcting for a geometry of a virtual image according to an angle and direction of a source display with respect to a target display.

The Virtual Object Behavior Module is adapted to receive input from the Object and Velocity and Direction Module, and to apply such input to a VO being shown in the display. Thus, for example, the Object and Gesture Recognition System would interpret the input from the image detector ID by mapping the captured movements of a user's hand to recognized movements, the Virtual Object Tracker Module would associate the VO's position and movements to the movements as recognized by Object and Gesture Recognition System, the Object and Velocity and Direction Module would capture the dynamics of the VO's movements, and the Virtual Object Behavior Module would receive the input from the Object and Velocity and Direction Module to generate data that would direct the movements of the VO to correspond to the input from the Object and Velocity and Direction Module.

The Screen Rendering Module is adapted to receive the data from the Virtual Object Behavior Module, and to render the VO and/or virtual bindings on a screen such as ED1 or ED2 in a manner consistent with such received data. Thus, the data from the Virtual Object Behavior Module would determine the position and dynamics of the VO and or associated virtual binding, for example, and the Screen Rendering Module would depict the VO and/or associated virtual binding on an ED accordingly. The Screen Rendering Module could further be adapted to receive data from the Adjacent Screen Perspective Module to either depict a target landing area for the VO if the VO could be moved to the display of the device with which the Adjacent Screen Perspective Module is associated. Thus, for example, if the VO is being moved from ED1 to ED2, Adjacent Screen Perspective Module 2 could send data to Screen Rendering Module 2 to suggest, for example in shadow form, one or more target landing areas for the VO on ED2 that track to a user's hand movements.

As further shown in the embodiment of FIG. 4, the GCS1 of D1 may also include a Touch Screen System 1, such as a conventional Touch Screen System, which may include a touch screen sensor TSS. Data from the TSS may be fed to a Touch Screen Module which may comprise hardware, software, firmware or a combination of the same. The Touch Screen Module may take the data from the TSS, for example to map the touch gesture of a user's hand on the screen to a corresponding dynamic behavior of a VO. The Touch Screen Module may for example include a Momentum and Inertia Module that allows a variety of moment behavior for a VO based on input from a user's hand. The use of a Momentum and Inertia Module is well known. For example, a Touch Screen System associated with the iPad product manufactured by the Apple Corporation generates a scroll momentum of one or more VO's on the iPad screen based on a swipe rate of a user's finger relative to the screen. The Touch Screen Module according to an embodiment may for example be adapted to interpret certain hand interactions of a user with respect to a screen, such as, for example, a pinching gesture, which may be interpreted by the Touch Screen Module to indicate the user's wish to lift the VO from the display screen, and/or to begin generating a virtual binding associated with the VO, as will be explained with respect to FIGS. 1a-1h and 2a-2d further below. For example, to differentiate between a zoom command, which in a current Touch Screen System typically involves moving the thumb and forefinger of a hand close together while those fingers are touching a screen in question, and a pinch and lift command to pinch and lift a VO from a screen, the Touch Screen Module could for example be adapted to interpret a gesture as a pinch and lift command where the thumb and forefinger of a user's hand are brought more closely together than a zoom gesture.

Although the shown embodiment of FIG. 4 depicts each device as incorporating an image detector, and various software modules for mapping input data from the image detectors to control input, embodiments are not so limited. Thus, for example, D1 and D2 could be adapted to process input data from a shared image detector (not shown), or from a shared image processing system (not shown) including an image detector coupled to an Object and Gesture Recognition Module, a Virtual Object Tracker Module, an Object Velocity and Direction Module and a Virtual Object Behavior Module, for example, this processing system being shared as between D1 and D2 to move the VO from ED1 to ED2 (FIGS. 1a-1h and 2a-2d). In addition, although FIG. 4 depicts D1 as including a Touch Screen System, embodiments encompass within their scope the incorporation of a Touch Screen System in both D1 and D2, or in none of D1 and D2.

Referring first to the example of FIGS. 1a-1h and to FIG. 4, an embodiment is depicted where: (1) a virtual object VO may be acquired from the screen of first electronic display ED1 belonging to first electronic device D1, virtually picked up by a user's hand, moved over to a location closer to the screen of second electronic display ED2 belonging to second electronic device D2, and then virtually released onto the latter screen; and (2) VO may be acquired from the screen of ED2 and virtually moved back to the ED1.

Figure 1A:
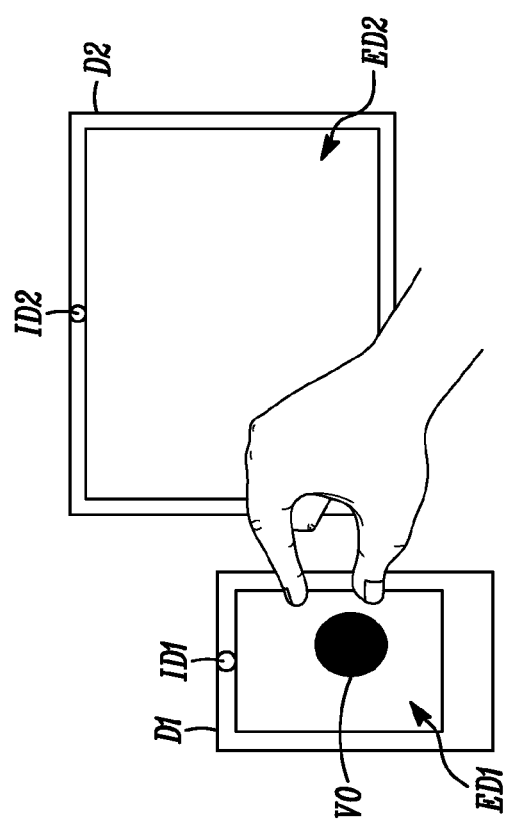
Figure 1D:
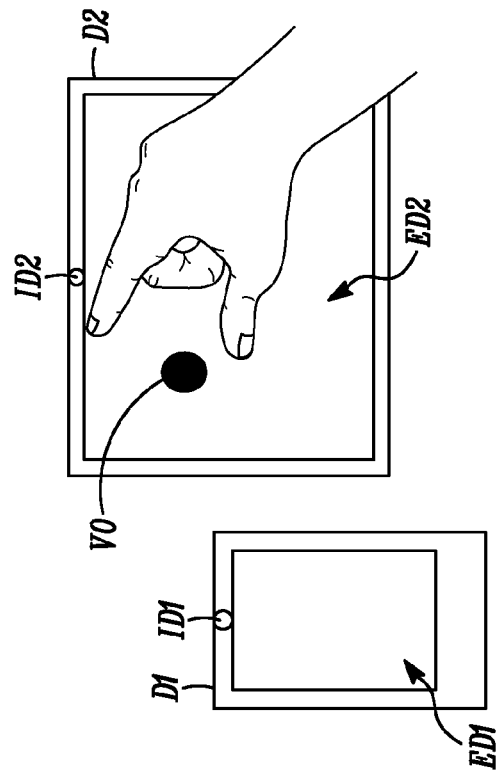
Figure 1C:
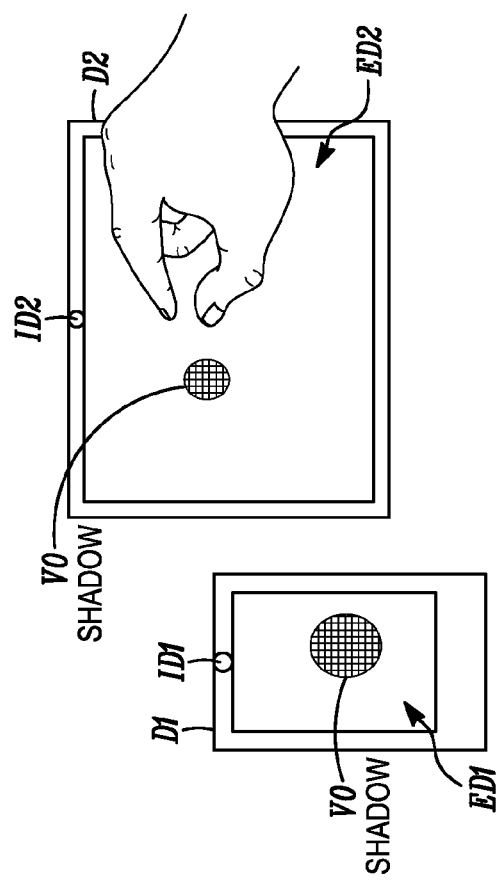
Figures 1G, 1H:
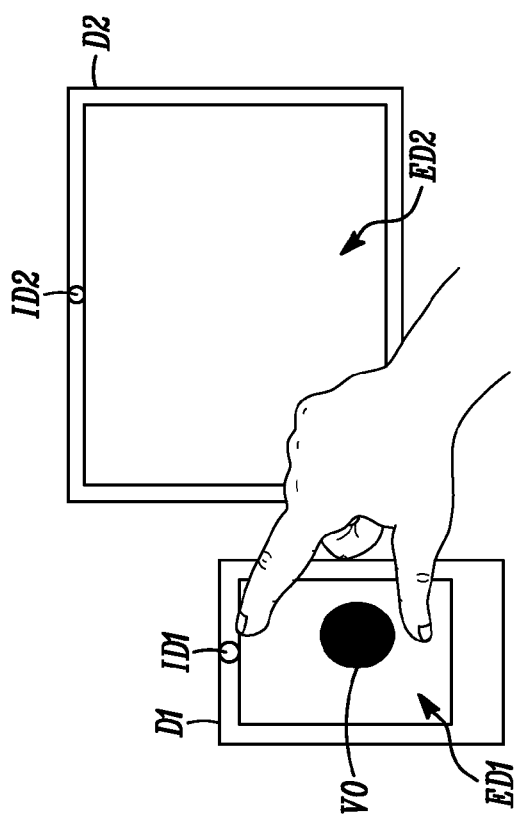

Referring first then to FIG. 1a, a virtual object VO appears on the screen of ED1 of device D1, which in this embodiment comprises a smartphone device as previously noted. The user's hand is shown in FIG. 1a as moving toward VO, and as being about to pinch and lift it from ED1. Referring next to FIG. 1b, the user's hand is shown as pinching VO in order to acquire it, virtually, between its thumb and finger, through a touch screen pinch gesture. The Touch Screen Sensor System of FIG. 4 may be active at this point to sense and interpret the interactions between the user's hand and the screen of ED1. Referring next to FIG. 1c, the user's hand is depicted as still virtually holding the VO, having moved the same to a location over the screen of ED2, that is, over the screen of the notebook display. At least from the time the user's hand leaves its contact position with respect to the screen of ED1, ID1 or ID2 or both track its air movements interacting with the VO, using GCS1 and/or GCS2 as described with respect to FIG. 4 above. Thus, by the time the user's hand is disposed over the notebook display ED2, a shadow of the VO may be shown in ED1 at the location where the user's hand acquired the same, and a shadow of the VO may be also shown in ED2 at an optional target release location of the VO on ED2 before the VO is actually moved to ED2. Referring next to FIG. 1d, the user's hand is shown as making a pinch-release gesture, which may be captured by ID2 in order to effect a virtually release of the VO onto ED2 as shown. As a result of the release gesture, the VO, with underlying properties and data, is effectively moved from D1 to D2 by way of being moved from ED1 to ED2. Referring next to FIG. 1e, the user's hand is shown as being disposed close to the screen of ED2 in order to re-acquire VO on ED2. In the depiction of FIG. 1e, the user's hand makes a air pinching gesture, which may be captured by ID1 or ID2 or both as an acquiring gesture with respect to VO. Referring next to FIG. 1f, the user's hand is depicted as still virtually holding the VO, having moved the same to a location over the screen of ED1, that is, over the screen of the smartphone display. By the time the user's hand is disposed over the notebook display ED2, a shadow of the VO may be shown in ED2 at the location where the user's hand acquired the same, and a shadow of the VO may be also shown in ED1 at an optional target release location of the VO on ED1 before the VO is actually moved to ED1. Referring next to FIG. 1g, the user's hand is shown as making a pinch-release gesture, which may be captured by ID2 in order to effect a virtually release of the VO onto ED2 as shown. As a result of the release gesture, the VO, with underlying properties and data, may be effectively moved back from D2 to D1 by way of being moved from ED2 to ED1. Referring next to FIG. 1h, the VO is shown as having moved from its release location, by virtue of inertia capabilities of GCS1 (FIG. 4) associated with D1, which effects a continued movement of the VO across the screen of ED1 based on the dynamics of the user's hand release gestures and virtual properties of the VO. Throughout the process as depicted in FIGS. 1a-1h, GCS1 and GCS2 as described with respect to FIG. 4 may be active to track the user's hand movements to effect a movement of the VO beyond a given display.

Figure 2D:
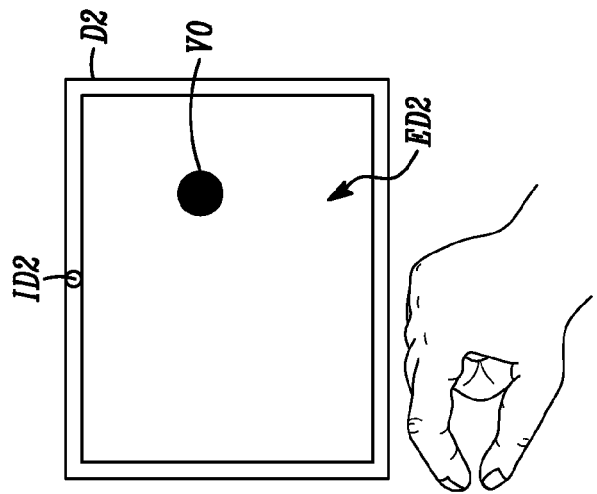
Figure 2D:
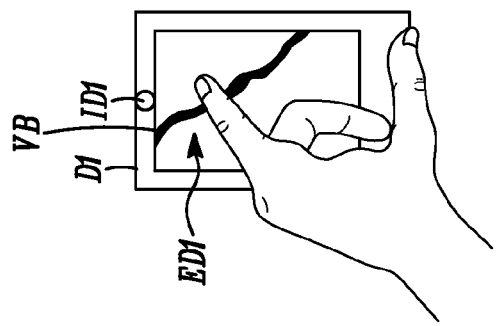
Figure 2C:
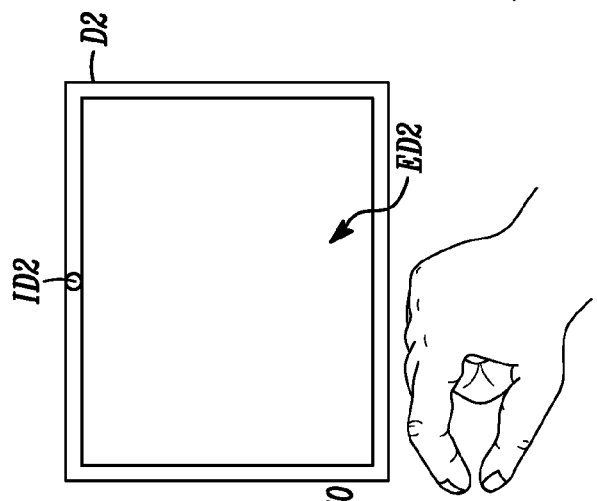
Figure 2C:
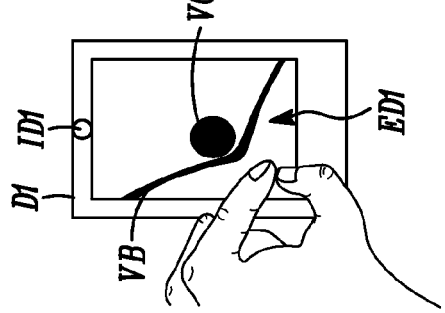

Referring next to FIGS. 2a-2d, another embodiment is depicted where a user's hand or hands are effective to create a virtual binding on an electronic display that may be effective to move a VO from the display to another display. As depicted in FIG. 2a, a user's hand may pinch on a screen, for example at a corner thereof, and, as depicted in FIG. 2b, the user's hand may then move the pinched fingers back from the screen of ED1, at which time a virtual binding virtual binding may appear to protrude from the screen of ED1 as shown, enhanced with 3D. As shown in FIG. 2b, and as explained above, a virtual binding may comprise a 3D virtual tether between the fingers and the VO being manipulated. A virtual binding may thus provide a simulation of motion memory with respect to a user's body part movements, being critical in providing visual feedback to the user regarding the user's movements. A virtual binding may for example appear in the form of one or more virtual tethers or a virtual wall. A virtual binding may for example be embodied as a cross-bow or a sling shot, or having a shape of any other virtual object that may be used to move an object from one virtual location to another. Referring next to FIG. 2c, the user may intercept the virtual binding with the other hand, by for example making a pinching gesture with respect to the same as shown. Such an interaction with the virtual binding may cause the virtual binding to bend, and hence to for example pull VO toward itself as the virtual binding stretches toward to the user's other hand. Thus, interaction with the virtual binding may cause changes to the characteristics of the virtual binding, such as its dynamic properties (kinetic energy, target direction, etc). Referring next to FIG. 4d, the user's other hand is seen as effecting a releasing gesture with respect to the virtual binding, which, in the shown example, causes the VO to appear now on ED2 according to inertial properties of the same. Throughout the process as depicted in FIGS. 2a-2d, GCS1 and GCS2 as described with respect to FIG. 4 may be active to track the user's hand movements to effect a movement of the VO beyond a given display.

Referring next to FIGS. 3a-3c, an alternative embodiment is depicted, where a VO is moved beyond an electronic display by being moved to a bezel region of a screen. By "bezel," what is meant in the instant description is a region that is at the rim or edge of a display. A VO may for example be moved to a bezel of a device in the case of space constraints on the device display, or for other reasons. Referring first to FIG. 4a, a user's hand virtually acquires a VO between a thumb and a finger through a touch screen pinch gesture on ED1, as previously described with respect to FIG. 1b. Referring next to FIG. 4b, a user's hand may gesture the pinch fingers to a bezel region of the screen beyond ED1 as shown. Next, as seen in FIG. 4c, the user's hand may make a pinch-release gesture at the bezel region as shown, which gesture may release the VO in the bezel region of D1. A marker M may then show a location of the VO placed on the bezel of D1. Throughout the process as depicted in FIGS. 3a-3c, a gesture capture system similar to GCS1 as shown in FIG. 4 may be active to track the user's hand movements to effect a movement of the VO beyond ED1 and to the bezel region.

With respect to the embodiments of FIGS. 1a-1h, FIGS. 2a-2d and FIGS. 3a-3c, while only certain specific hand movements and gestures are depicted to effect corresponding desired results, embodiments are not so limited, and encompass within their scope a tailoring of the gesture capture systems to any set of gestures as applicable, whether by hand or otherwise, to effect a movement of a VO beyond a given display. For example, a VO could be batted or flicked toward another display, or a flick of the index finger from the thumb for example could denote a wish for cross-screen movement of a VO. In the alternative, to indicate that a cross-screen event is desired, a user could first enter a mode through a gesture or touch on a button on a given device. The noted embodiments may further allow a transferring of inertial properties of a release gesture to the behavior of a VO once it has been released onto a new display (such as, for example, by being virtually splattered or flattened), and, according to one embodiment, such a gesture capture system as described with respect to FIG. 4 may be adapted to allow an interaction of such a VO, based on its inertial properties, with other objects on the new screen.

In addition, with respect to the embodiment of FIGS. 2a-2d, it is not necessary for a virtual binding to be controlled by two hands, and embodiments encompass the manipulation of a virtual binding in any other manner, such as, for example, by a single hand. Virtual binding could further be depicted in 3D or not, and could for example be manipulated using gestures other than those depicted in the figures, such as, for example, through shaking a hand to delete a virtual binding or cutting them with another hand. Moreover, virtual binding's and cross-display movements could occur according to an embodiment without the user having to touch the display, such as through air movements of a user's hands.

It is further noted with respect to embodiments that although the described embodiments of FIGS. 1*a*-1*h*, 2*a*-2*d* and 3*a*-3*c* pertain to using hand gestures to manipulate a VO, embodiments are not so limited, and include within their scope the use of movements of any body part(s) to manipulate a VO, and also to the use of different body parts tethered to different parts of a VO, such as through virtual bindings. The body part could include any part of a body, such as a hand, a foot, a head, eyes, legs, arms, etc.

Figure 5:
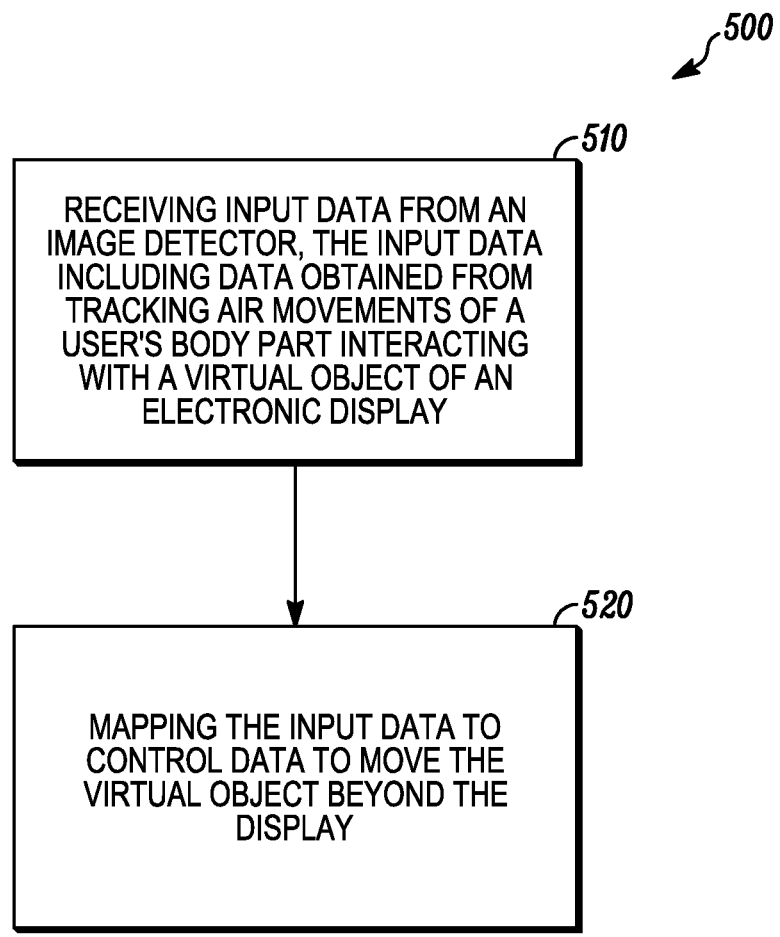
FIG. 5 is a flow diagram of a method embodiment.

Referring next to FIG. 5, a flowchart is shown for a method embodiment. According to FIG. 5, a method 500 may include, at block 510, receiving input data from an image detector, the input data including data obtained from tracking air movements of a user's body part interacting with a virtual object of an electronic display, and at block 520, mapping the input data to a control input to move the virtual object beyond the display.

Advantageously, an embodiment allows gesture recognition, such as by way of a combination of touch and air gestures, to permit a user to virtually acquire a virtual object, and to move it across screens or to a bezel region of a display. An embodiment further allows the use of gesture recognition to allow a user to virtually throw or shoot a virtual object from one screen to another screen, optionally preserving the inertial properties of the user's release movement in the dynamic behavior of the virtual object on the new screen. Moreover, advantageously, an embodiment allows gesture recognition to allow a user to control the behavior of a virtual object by making gestures through virtual bindings, especially for example, after having just having placed the virtual object on the screen through a gesture. Virtual bindings provide real-time visual feedback to link the cognitive processes and tactile expectations experienced with physical object manipulation with graphical emulations experienced virtually. For example, virtual bindings advantageously allow a virtual object to be manipulated by body part movements, such as by being moved, pushed down to be flattened or enlarged, to otherwise manipulated through a puppet-string like control. Moreover, advantageously, an embodiment allows multiple points on the same user to be bound to various elements on a display with virtual bindings (for example, a virtual binding could appear on the screen for each of multiple fingers, or for each arm and each leg, etc). The virtual objects thus bound could subsequently advantageously be controlled with coordinated gestures of the multiple points on the user.

According to some embodiments, a user may advantageously be able to bounce a virtual object from one display to another. The user could for example be holding a VO, and throw it toward a display. The VO would bounce off of the first display and then go to the other display and potentially come back to the first display. An embodiment of an apparatus already described would thus enable tracking of gestures, position, and physics of the virtual objects. In the realm of some embodiments, the user could also launch a virtual projectile from one screen to another. With a handheld device with screen, the user could draw back a VO, showing virtual binding's, then release the VO to virtually bounce off the screen of the handheld device the user is holding and toward a second display. In such a system, the user could select a VO with the touch screen (the selection could automatically move to a virtual binding to manipulate the VO, or the user could simply drag the VO, depending on the game). The selected VO could be launched as a projectile using the virtual binding. In playing games with such a system, the first system could track the progress of the game to a point then pass parameters (via direct wireless connection or over network) to the second device, which would then pick up the game from that point. In the virtual binding scenarios, the user could use voice commands to change the nature of the object to be launched (color, category, capabilities) or to change the nature of how it is launched, or to change the view that appears on the displays as the user does it. Alternatively, secondary movements such as eye tracking could be used to influence a targeting and physics of the virtual object. According to one option, a user could use the system to scan a real object then use it in the virtual world as a VO.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A device, comprising:
a touch screen display, and
a processor to receive (i) touch input data from the touch screen display, the touch input data including data obtained from sensing interactions of a user with a virtual object of the touch screen display and (ii) air movement input data from an image detector, the air movement input data including data obtained from tracking air movements of a body part of the user interacting with the virtual object, the processor to map the touch and air movement input data to a control input to move the virtual object beyond the touch screen display.

2. The device of claim 1, further comprising the image detector.

3. The device of claim 1, wherein the body part is a hand or a part of a hand.

4. The device of claim 1, wherein:
the touch screen display is a first display; and
the processor is to map the touch and air movement input data to the control input to move the virtual object from the first display toward a second display.

5. The device of claim 4, wherein:
the device is a first device; and
the processor is to determine a proximity to the first device of a second device including the second display before mapping the input data to the control input.

6. The device of claim 1, wherein the interactions include a pinching motion of the user's body part with respect to a location of the virtual object on the display screen of the first display, the processor to map the first input data to the control input to pinch the virtual object from the first display.

7. The device of claim 6, wherein the air movements include a releasing motion of the user's body part with respect to target location of the virtual object on the second display, the processor to map the second input data to the control input to release the virtual object onto the second display.

8. The device of claim 1, wherein the processor is to map the first input data and the second input data to the control input to create a virtual binding of the virtual object.

9. The device of claim 8, wherein the user's body part is the user's first body part, the processor to receive a third input data from the image detector, the third input data including data on air movements by a second body part of the user interacting with the virtual binding on the first display, to processor to map the third input data to the control input to manipulate the virtual binding.

10. The device of claim 1, wherein the processor is to map the input data to the control input to move the virtual object from the touch screen display to a bezel of the device.

11. The device of claim 10, wherein the processor is to map the input data to the control input to indicate a position of the virtual object on the bezel on a map of the display.

12. A device, comprising:
a processor to receive (ii) touch input data from a touch screen display of a first device, the touch input data including data obtained from sensing interactions of a user with a virtual object of the touch screen display and (ii) air movement input data from an image detector of the first device, the air movement input data including data obtained from tracking air movements of a body part of the user interacting with the virtual object, the processor to map the touch and air input data to a control input to place the virtual object onto a second display of a second electronic device.

13. The device of claim 12, further including the image detector.

14. The device of claim 12, wherein the body part is a hand or a part of a hand.

15. The device of claim 12, wherein the processor is to determine a proximity to the second electronic device of the first electronic device including the touch screen display, and to map the input data to the control input to display an optional target location of the virtual object on the second display before moving the virtual object to the second display.

16. The device of claim 12, wherein the air movements include a releasing motion of the user's body part with respect to a target location of the virtual object on the second display.

17. The device of claim 12, wherein the input data includes data on inertial properties of the releasing motion, the processor to map the input data to the control input to determine an inertial behavior of the virtual object once on the second display.

18. A method comprising:
receiving touch input data from a touch screen display, the touch input data including data obtained from sensing interactions of a user with a virtual object of the touch screen display;
receiving air movement input data from an image detector, the input data including data obtained from tracking air movements of a body part of the user interacting with the virtual object; and
mapping the touch screen and air movement input data to a control input to move the virtual object beyond the touch screen display.

19. The method of claim 18, wherein:
the touch screen display is a first display; and
mapping includes mapping the touch screen and air movement input data to the control input to move the virtual object from the first display toward a second display.

20. The method of claim 19, wherein the touch screen display is part of a first electronic device, the method further including determining a proximity to the first electronic device of a second electronic device including the second display before mapping.

21. The method of claim 19, wherein mapping includes mapping the input data to the control input to further place the virtual object onto the second display.

22. The method of claim 21, further including determining a proximity to the second electronic device of the touch screen display, wherein mapping includes mapping the input data to the control input to display an optional target location of the virtual object on the second display before moving the virtual object to the second display.

23. The method of claim 21, wherein the air movements include a releasing motion of the user's body part with respect to a target location of the virtual object on the second display.

24. The method of claim 21, wherein:
the input data includes data on inertial properties of the releasing motion; and
mapping includes mapping the input data to the control input to determine an inertial behavior of the virtual object once on the second display.

25. The method of claim 18, wherein:
the interactions include a pinching motion of the user's body part with respect to a location of the virtual object on a display screen of the first display; and
mapping includes mapping the first input data to the control input to pinch the virtual object from the first display.

26. The method of claim 25, wherein:
the air movements include a releasing motion of the user's body part with respect to a target location of the virtual object on the second display; and
mapping including mapping the second input data to the control input to release the virtual object onto the second display.

27. The method of claim 18, wherein mapping includes mapping the first input data and the second input data to the control input to create a virtual binding of the virtual object.

28. The method of claim 18, wherein mapping includes mapping the input data to the control input to move the virtual object from the electronic display to a bezel of the touch screen display.

29. The method of claim 28, wherein mapping includes mapping the input data to the control input to indicate a position of the virtual object on the bezel on a map of the touch screen display.

30. A non-transitory computer readable medium encoded with computer executable instructions, which, when accessed, cause a machine to perform operations comprising:
receiving touch input data from a touch screen display, the touch input data including data obtained from sensing interactions of a user with a virtual object of the touch screen display;
receiving air movement input data from an image detector, the air movement input data including data obtained from tracking air movements of a body part of the user interacting with the virtual object; and
mapping the touch screen and air movement input data to a control input to move the virtual object beyond the touch screen display.

31. The computer readable medium of claim 30, wherein:
the touch screen display is a first display; and
mapping includes mapping the input data to the control input to move the virtual object from the first display toward a second display.

* * * * *